US011947803B2

United States Patent
Cummins et al.

(10) Patent No.: US 11,947,803 B2
(45) Date of Patent: Apr. 2, 2024

(54) EFFECTIVE UTILIZATION OF DIFFERENT DRIVE CAPACITIES

(71) Applicant: EMC IP Holding Company LLC, Hopkinton, MA (US)

(72) Inventors: Daniel E. Cummins, Hudson, NH (US); Vamsi K. Vankamamidi, Hopkinton, MA (US); Shuyu Lee, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/079,968

(22) Filed: Oct. 26, 2020

(65) Prior Publication Data

US 2022/0129165 A1 Apr. 28, 2022

(51) Int. Cl.
*G06F 3/06* (2006.01)

(52) U.S. Cl.
CPC .......... *G06F 3/0613* (2013.01); *G06F 3/0619* (2013.01); *G06F 3/0631* (2013.01); *G06F 3/064* (2013.01); *G06F 3/0653* (2013.01); *G06F 3/0689* (2013.01)

(58) Field of Classification Search
CPC .... G06F 3/0679; G06F 3/0685; G06F 3/0631; G06F 3/0689; G06F 3/061; G06F 3/065; G06F 3/0619; G06F 3/064; G06F 3/0653
USPC ................... 711/154, 114, 12.001, 103, 170
See application file for complete search history.

(56) References Cited

U.S. PATENT DOCUMENTS

| | | | |
|---|---|---|---|
| 9,462,055 B1 | 10/2016 | Herrin et al. | |
| 10,114,772 B1 * | 10/2018 | Steinmacher-Burow | G06F 13/1684 |
| 10,126,971 B1 * | 11/2018 | Jain | G06F 3/0685 |
| 10,860,245 B2 | 12/2020 | Zhao et al. | |
| 10,936,464 B2 | 3/2021 | Vishwakarma et al. | |
| 10,956,069 B2 | 3/2021 | Kushner et al. | |
| 10,996,858 B2 | 5/2021 | Zhao et al. | |
| 11,023,315 B1 * | 6/2021 | Jadon | G06F 3/0659 |
| 11,048,643 B1 * | 6/2021 | Lercari | G06F 3/0616 |
| 2009/0210464 A1 * | 8/2009 | Chiang-Lin | G06F 12/023 |
| 2011/0138148 A1 * | 6/2011 | Friedman | G06F 3/0644, 711/E12.001 |
| 2015/0160885 A1 * | 6/2015 | Hara | G06F 3/0665, 710/74 |
| 2016/0179386 A1 * | 6/2016 | Zhang | G06F 3/0679, 711/103 |

(Continued)

*Primary Examiner* — Yaima Rigol
*Assistant Examiner* — Edward Waddy, Jr.
(74) *Attorney, Agent, or Firm* — BainwoodHuang (57) ABSTRACT

Techniques for providing effective utilization of different drive capacities in storage appliances. The techniques include providing a storage drive array that has a first set of storage drives and a second set of storage drives. Each storage drive in the first set has a first drive capacity and each storage drive in the second set has a second drive capacity. The first drive capacity is higher than the second drive capacity. The techniques include allocating, within the first drive capacity, at least a first sub-capacity and a second sub-capacity. The first sub-capacity is equal to the second drive capacity. The techniques include placing blocks of hot data in the first sub-capacities of the storage drives in the first set and/or the second drive capacities of the storage drives in the second set, and placing blocks of cold data in the second sub-capacities of the storage drives in the first set.

11 Claims, 6 Drawing Sheets

(56) References Cited

U.S. PATENT DOCUMENTS

2018/0260154 A1\* 9/2018 Dronamraju ............ G06F 3/068
2020/0174686 A1\* 6/2020 Song ...................... G06N 5/046
2020/0401316 A1\* 12/2020 Hankins .............. G06F 12/0868

\* cited by examiner

EFFECTIVE UTILIZATION OF DIFFERENT DRIVE CAPACITIES

BACKGROUND

In data storage systems, storage appliances have read-write input/output (IO) access to storage objects such as filesystems, volumes (VOLs), virtual volumes (VVOLs), logical units (LUs), and so on. The storage appliances are configured to receive storage IO requests from one or more client computers over a network. In response to the storage IO requests, the storage appliances perform storage IO operations (e.g., read-write IO operations) to read/write blocks, files, pages, segments, chunks, or any other suitable units of client data to/from one or more of the storage objects. Storage drive arrays accessible to the storage appliances provide physical storage for the client data. The storage drive arrays include a plurality of storage drives such as magnetic disk drives, electronic flash drives, optical drives, and so on. The storage drives include high capacity drives, mid-capacity drives, and/or low capacity drives, depending upon the storage needs of data storage customers.

SUMMARY

In storage drive arrays that include multiple storage drives with different capacities (e.g., high capacity, mid-capacity, low capacity), each storage drive's IO performance is typically not tied to its capacity. In other words, the IO performance of a storage drive with a high capacity can be similar to the IO performance of another storage drive with a lower capacity. However, in the case of high capacity drives combined with redundant array of independent disk (RAID) binding, data storage customers can encounter IO bottleneck (or IO operations per second (IOPS)) problems due to increased numbers of storage IO operations being directed to the high capacity drives. To address such IO bottleneck (or IOPS) problems, data storage customers can implement storage algorithms that utilize an available drive capacity only if the number of storage drives with the incremental capacity exceeds a specified count, such as the RAID width+1. However, while such storage algorithms can avoid unwanted IO bottleneck (or IOPS) problems, they can result in wasted capacity if the number of storage drives with the incremental capacity fails to exceed the specified count.

Techniques are disclosed herein for providing effective utilization of different drive capacities in storage appliances. The disclosed techniques can include providing a storage drive array that has a first set of storage drives and at least one second set of storage drives. Each of the storage drives in the first set can have a first drive capacity and each of the storage drives in the second set can have a second drive capacity. The first drive capacity can be higher than the second drive capacity. The disclosed techniques can further include allocating, within the first drive capacity of each storage drive in the first set, at least a first sub-capacity and a second sub-capacity. The first sub-capacity can be equal to the second drive capacity of each storage drive in the second set. The disclosed techniques can still further include placing blocks of hot data in the first sub-capacities of the storage drives in the first set and/or the second drive capacities of the storage drives in the second set, and placing blocks of cold data in the second sub-capacities of the storage drives in the first set. By placing blocks of cold data in the second sub-capacities of the storage drives in the first set, uniform IOPS densities across the first set of storage drives and the second set of storage drives can be better maintained, while avoiding wasting unused capacity across at least the storage drives in the first set.

In certain embodiments, a method of providing effective utilization of different drive capacities in a storage appliance includes providing a first set of storage drives and at least one second set of storage drives. Each of the storage drives in the first set has a first storage capacity, and each of the storage drives in the second set has a second storage capacity. The first storage capacity is higher than the second storage capacity. The method further includes allocating at least a first sub-capacity and a second sub-capacity within the first storage capacity of each storage drive in the first set. The first sub-capacity of each storage drive in the first set is equal to the second storage capacity of each storage drive in the second set. The method further includes maintaining a uniform IOPS (TO operations per second) density across the storage drives in the first set and the storage drives in the second set at least in part by placing blocks of cold data in allocated second sub-capacities of the storage drives in the first set, thereby avoiding wasting unused capacity across at least the storage drives in the first set.

In certain arrangements, the method further includes placing blocks of hot data in one or more of (i) allocated first sub-capacities of the storage drives in the first set, and (ii) second storage capacities of the storage drives in the second set.

In certain arrangements, the method further includes placing the blocks of cold data in the allocated second sub-capacities of the storage drives in the first set in accordance with a first RAID configuration, and placing the blocks of hot data in one or more of (i) the allocated first sub-capacities of the storage drives in the first set and (ii) the second storage capacities of the storage drives in the second set in accordance with a second RAID configuration.

In certain arrangements, the allocated second sub-capacities of the storage drives in the first set correspond to a cold storage tier, and the allocated first sub-capacities of the storage drives in the first set and the second storage capacities of the storage drives in the second set collectively correspond to a hot storage tier. The method further includes scaling a performance level of the hot storage tier by placing the blocks of hot data in accordance with the second RAID configuration that spans up to all of the storage drives in the first set and the second set.

In certain arrangements, the first sub-capacity and the second sub-capacity correspond to predetermined threshold percentages of the first storage capacity. The method further includes determining that the cold data placed in the allocated second sub-capacities of the storage drives in the first set transition to hot data, and reallocating the first sub-capacity and the second sub-capacity within the first storage capacity of each storage drive in the first set while maintaining the predetermined threshold percentages of the first storage capacity. Having reallocated the first sub-capacity and the second sub-capacity within the first storage capacity, the hot data is located within reallocated first sub-capacities of the storage drives in the first set.

In certain arrangements, the method further includes determining that the cold data placed in the allocated second sub-capacities of the storage drives in the first set transition to hot data, and moving the hot data from the allocated second sub-capacities of the storage drives in the first set to second storage capacities of the storage drives in the second set.

In certain arrangements, the method further includes performing the allocating of one or more of the first sub-capacity and the second sub-capacity within contiguous storage space of the first storage capacity of each storage drive in the first set.

In certain arrangements, the method further includes performing the allocating of one or more of the first sub-capacity and the second sub-capacity within noncontiguous storage space of the first storage capacity of each storage drive in the first set.

In certain embodiments, a system for providing effective utilization of different drive capacities in a storage appliance includes a storage drive array having a first set of storage drives and at least one second set of storage drives. Each of the storage drives in the first set has a first storage capacity, and each of the storage drives in the second set has a second storage capacity. The first storage capacity is higher than the second storage capacity. The system further includes a memory, and processing circuitry configured to execute program instructions out of the memory to allocate at least a first sub-capacity and a second sub-capacity within the first storage capacity of each storage drive in the first set. The first sub-capacity of each storage drive in the first set is equal to the second storage capacity of each storage drive in the second set. The processing circuitry is further configured to execute the program instructions out of the memory to maintain a uniform IOPS (TO operations per second) density across the storage drives in the first set and the storage drives in the second set at least in part by placing blocks of cold data in allocated second sub-capacities of the storage drives in the first set, thereby avoiding wasting unused capacity across at least the storage drives in the first set.

In certain arrangements, the processing circuitry is further configured to execute the program instructions out of the memory to place blocks of hot data in one or more of (i) allocated first sub-capacities of the storage drives in the first set, and (ii) second storage capacities of the storage drives in the second set.

In certain arrangements, the first sub-capacity and the second sub-capacity correspond to predetermined threshold percentages of the first storage capacity, and the processing circuitry is further configured to execute the program instructions out of the memory to determine that the cold data placed in the allocated second sub-capacities of the storage drives in the first set transition to hot data, and reallocate the first sub-capacity and the second sub-capacity within the first storage capacity of each storage drive in the first set while maintaining the predetermined threshold percentages of the first storage capacity. Having reallocated the first sub-capacity and the second sub-capacity within the first storage capacity, the hot data is located within reallocated first sub-capacities of the storage drives in the first set.

In certain arrangements, the processing circuitry is further configured to execute the program instructions out of the memory to determine that the cold data placed in the allocated second sub-capacities of the storage drives in the first set transition to hot data, and move the hot data from the allocated second sub-capacities of the storage drives in the first set to second storage capacities of the storage drives in the second set.

In certain arrangements, the processing circuitry is further configured to execute the program instructions out of the memory to allocate one or more of the first sub-capacity and the second sub-capacity within contiguous storage space of the first storage capacity of each storage drive in the first set.

In certain arrangements, the processing circuitry is further configured to execute the program instructions out of the memory to allocate one or more of the first sub-capacity and the second sub-capacity within noncontiguous storage space of the first storage capacity of each storage drive in the first set.

In certain arrangements, each of the storage drives in the first set and each of the storage drives in the second set correspond to the same type of storage drive.

In certain arrangements, the blocks of cold data placed in the allocated second sub-capacities of the storage drives in the first set conform to a given RAID configuration.

In certain embodiments, a computer program product includes a set of non-transitory, computer-readable media having instructions that, when executed by processing circuitry, cause the processing circuitry to perform a method of providing effective utilization of different drive capacities in a storage appliance. The method includes providing a first set of storage drives and at least one second set of storage drives. Each of the storage drives in the first set has a first storage capacity, and each of the storage drives in the second set has a second storage capacity. The first storage capacity is higher than the second storage capacity. The method further includes allocating at least a first sub-capacity and a second sub-capacity within the first storage capacity of each storage drive in the first set. The first sub-capacity of each storage drive in the first set is equal to the second storage capacity of each storage drive in the second set. The method further includes maintaining a uniform IOPS (IO operations per second) density across the storage drives in the first set and the storage drives in the second set at least in part by placing blocks of cold data in allocated second sub-capacities of the storage drives in the first set, thereby avoiding wasting unused capacity across at least the storage drives in the first set.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing effective utilization of different drive capacities in storage appliances. The disclosed techniques can include providing a storage drive array that has a first set of storage drives and at least one second set of storage drives. Each of the storage drives in the first set can have a first drive capacity and each of the storage drives in the second set can have a second drive capacity. The first drive capacity can be higher than the second drive capacity. The disclosed techniques can further include allocating, within the first drive capacity of each storage drive in the first set, at least a first sub-capacity and a second sub-capacity. The first sub-capacity can be equal to the second drive capacity of each storage drive in the second set. The disclosed techniques can still further include placing blocks of hot data in the first sub-capacities of the storage drives in the first set and/or the second drive capacities of the storage drives in the second set, and placing blocks of cold data in the second sub-capacities of the storage drives in the first set. By placing blocks of cold data in the second sub-capacities of the storage drives in the first set, uniform IOPS densities across the first set of storage drives and the second set of storage drives can be better maintained, while avoiding wasting unused capacity across at least the storage drives in the first set.

Figure 1:
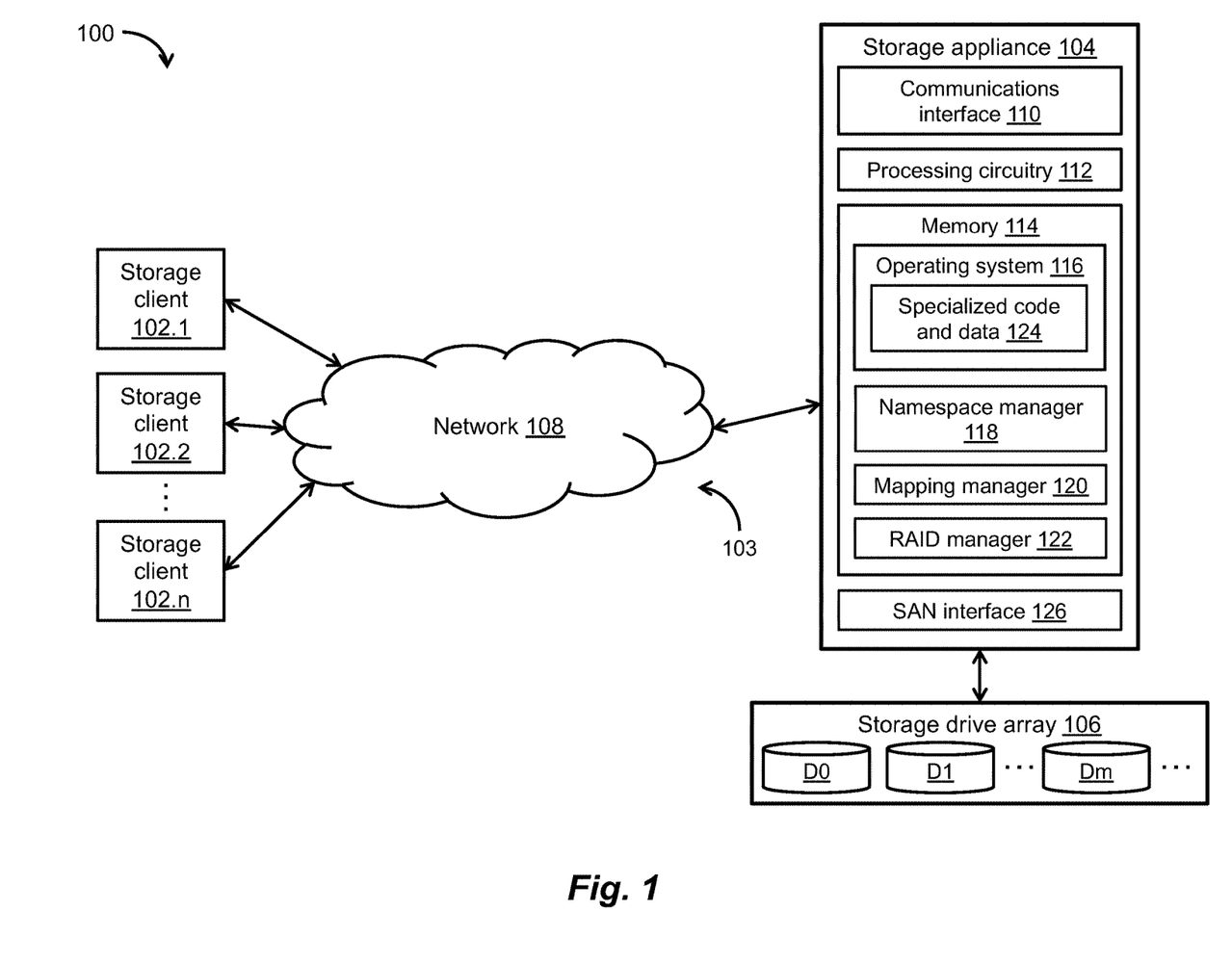
FIG. 1 is a block diagram of an exemplary storage system environment, in which techniques can be practiced for providing effective utilization of different drive capacities in a storage appliance.

FIG. 1 depicts an illustrative embodiment of an exemplary storage system environment 100, in which techniques can be practiced for providing effective utilization of different drive capacities in storage appliances. As shown in FIG. 1, the storage system environment 100 can include a plurality of storage client computers (also referred to herein as "storage client(s)") 102.1, 102.2, . . . , 102.n, a storage appliance 104, and a communications medium 103 that includes at least one network 108. For example, each of the plurality of storage clients 102.1, . . . , 102.n may be configured as a web server computer, a file server computer, an email server computer, an enterprise server computer, and/or any other suitable client/server computer or computerized device. The plurality of storage clients 102.1, . . . , 102.n can provide, over the network(s) 108, storage input/output (IO) requests (e.g., small computer system interface (i SC SI) commands, network filesystem (NFS) commands) to the storage appliance 104. Such storage 10 requests (e.g., write 10 requests, read 10 requests) can direct processing circuitry 112 included in the storage appliance 104 to write or read blocks, files, pages, segments, chunks, and/or any other suitable units of data storage to/from filesystems, volumes (VOLs), virtual volumes (VVOLs), logical units (LUs), or any other suitable storage objects and/or resources maintained in association with the storage appliance 104.

As shown in FIG. 1, the storage appliance 104 can include a communications interface 110, the processing circuitry 112, a memory 114, and a network (e.g., SAN) interface 126. The communications interface 110 can include an iSCSI interface, Ethernet interface, FC interface, InfiniBand interface, or any other suitable interface. The communications interface 110 can further include iSCSI adapters, Ethernet adapters, FC adapters, InfiniBand adapters, or any other suitable adapters for converting electronic, optical, and/or wireless signals received over the network(s) 108 to a form usable by the processing circuitry 112. The storage appliance 104 can access, over the SAN interface 126, a storage drive array 106, which can be configured to provide physical storage of client data. The storage drive array 106 can include multiple physical storage drives including at least "m+1" storage drives D0, D1, . . . , Dm, such as magnetic disk drives, electronic flash drives, optical drives, and/or any other suitable drives. The storage drive array 106 can be locally attached to an IO channel of the storage appliance 104 while also being accessible over the network(s) 108. In some embodiments, the storage drive array 106 can be implemented as a dual-ported drive, which can be shared between a pair of storage nodes implemented within a dual-node storage appliance.

The memory 114 (see FIG. 1) can include persistent memory (e.g., flash memory, magnetic memory) and/or non-persistent memory (e.g., dynamic random-access memory (DRAM), static random-access memory (SRAM)). The memory 114 can further include an operating system (OS) 116 such as a Linux operating system (OS), Unix OS, Windows OS, or any other suitable operating system. The memory 114 can be configured to store a variety of software constructs realized in the form of specialized code and data 124 (i.e., program instructions and data), as well as a namespace manager 118, a mapping manager 120, and a redundant array of independent disk (RAID) manager 122. The specialized code and data 124 can be executed by the processing circuitry 112 to carry out the techniques and/or methods disclosed herein.

The namespace manager 118 can be configured to maintain a namespace of storage objects, such as filesystems, VOLs, VVOLs, LUs, and so on, which are accessible to the plurality of storage clients 102.1, . . . , 102.n. As employed herein, the term "namespace" refers to a point-in-time (PIT) logical collection of storage objects, each of which can be represented by an index node (referred to herein as an "inode"). In some embodiments, the namespace maintained by the namespace manager 118 can include a set of storage objects (e.g., VVOLs) organized as a collection of inodes. For example, a VVOL may be made up of one or more storage extents, each of which may correspond to a range of storage sizes in a logical address space. Further, the range of storage sizes may correspond to a range of contiguous or noncontiguous logical addresses (e.g., logical block addresses (LBAs)) spanning a portion or all of the VVOL.

The mapping manager 120 can be configured, in a mapping layer of the storage appliance 104, to map storage extents of volumes (e.g., VVOLs) to corresponding RAID addresses, which, in turn, can be mapped to corresponding drive locations (e.g., drive extents) on the storage drive array 106. The mapping manager 120 can be further configured to determine what client data can be regarded as "hot data," and what client data can be regarded as "cold data." As employed herein, the term "hot data" refers to data (e.g., client data, system data) that is frequently accessed and/or modified or updated within the storage appliance 104, and the term "cold data" refers to data (e.g., client data, system data) that is infrequently accessed and/or rarely modified or updated within the storage appliance 104. The RAID manager 122 can be configured, in a RAID management layer of the storage appliance 104, to create or provision RAID stripes (also referred to herein as "RAID extents") across the drive extents of the storage drive array 106 in accordance with a given RAID configuration, such as RAID-5 or any other suitable RAID configuration. For example, in a storage drive array that includes "n" storage drives D1, D1, . . . , Dn, each RAID extent may consist of "n-p" data blocks and "p" parity blocks. Further, for a RAID-5 configuration, "n" may be equal to 5 and "p" may be equal to 1. The RAID manager 122 can be further configured to allocate capacities or sub-capacities of the storage drives D0, D1, . . . , Dm, . . . (see FIG. 1) for accommodating RAID extents containing hot data or cold data, as determined by the mapping manager 120. The operation of the mapping manager 120 and the RAID manager 122 will be further described below with reference to an illustrative example of the disclosed techniques for providing effective utilization of different drive capacities in storage appliances.

During operation of the storage appliance 104 (see FIG. 1), the storage drive array 106 can include at least a first set of storage drives and at least one second set of storage drives. Each of the storage drives in the first set can have a first drive capacity and each of the storage drives in the second set can have a second drive capacity. The first drive capacity can be higher than the second drive capacity. At least a first sub-capacity and a second sub-capacity can be allocated within the first drive capacity of each storage drive in the first set. The first sub-capacity can be equal to the second drive capacity of each storage drive in the second set. Blocks of hot data can be placed in the first sub-capacities of the storage drives in the first set and/or the second drive capacities of the storage drives in the second set. Further, blocks of cold data can be placed in the second sub-capacities of the storage drives in the first set. By placing blocks of cold data in the second sub-capacities of the storage drives in the first set, uniform IOPS densities across the first set of storage drives and the second set of storage drives can be better maintained, while avoiding wasting unused capacity across at least the storage drives in the first set.

Figure 2A:
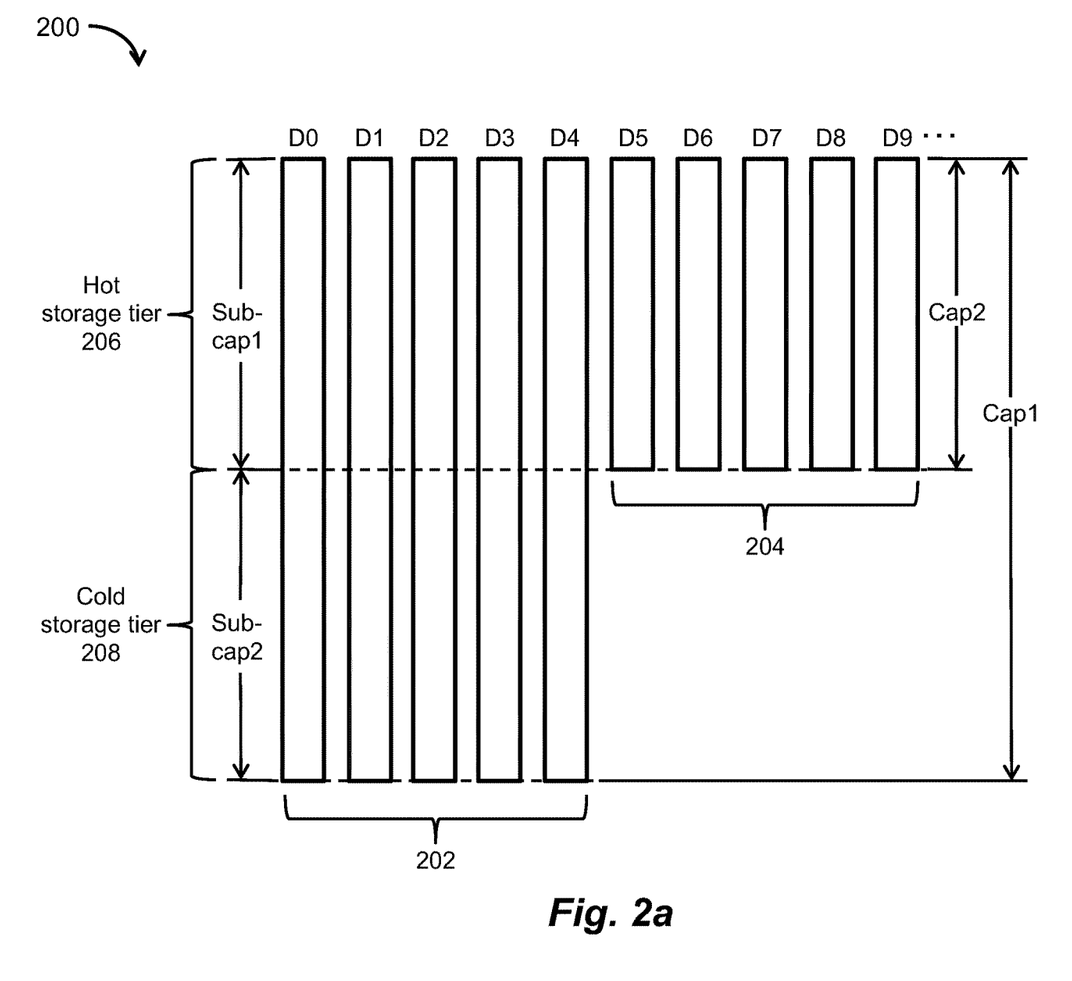
FIG. 2a is a block diagram of an exemplary storage drive array included in the storage appliance of FIG. 1, in which the storage drive array includes a first set of storage drives and at least one second set of storage drives, and a drive capacity of each storage drive in the first set is higher than a drive capacity of each storage drive in the second set.

The disclosed techniques for providing effective utilization of different drive capacities in storage appliances will be further understood with reference to the following illustrative example and FIGS. 1 and 2a-2c. In this example, it is assumed that the storage drive array 106 (see FIG. 1) includes at least "m+1" storage drives D0, D1, . . . , Dm, where m=9. For example, the storage drives D0, D1, . . . , D9 may be all HDDs, SSDs, or any other suitable type of storage drive. FIG. 2a depicts an exemplary storage drive array 200, which represents the storage drive array 106 including the storage drives D0 through D9. As shown in FIG. 2a, the storage drive array 200 includes a first set 202 of storage drives containing the storage drives D0, D1, D2, D3, D4 and a second set 204 of storage drives containing the storage drives D5, D6, D7, D8, D9. As further shown in FIG. 2a, each of the storage drives D5, D6, D7, D8, D9 in the second set 204 has a drive capacity designated as "Cap2," and each of the storage drives D0, D1, D2, D3, D4 in the first set 202 has a drive capacity designated as "Cap1," which is higher than the drive capacity, Cap2. For example, the drive capacity, Cap2, may be 1 terabyte (Tb) or any other suitable capacity, and the higher drive capacity, Cap1, may be 2 Tb or any other suitable capacity. It is noted that the storage drive array 200 can include any other suitable arrangement of storage drives with different drive capacities, such as high capacities (e.g., 8 Tb), mid-capacities (e.g., 4 Tb, 2 Tb), low capacities (e.g., 1 Tb), and so on.

In this example, the RAID manager 122 allocates a first sub-capacity "Sub-cap1" and a second sub-capacity "Sub-cap2" for accommodating RAID extents within the drive capacity, Cap1, of each storage drive D0, D1, D2, D3, D4 in the first set 202. Further in this example, the first sub-capacity, Sub-cap1, of each storage drive D0, D1, D2, D3, D4 is equal to the drive capacity, Cap2, of each storage drive D5, D6, D7, D8, D9 in the second set 204. The first sub-capacity, Sub-cap1, of each storage drive D0, D1, D2, D3, D4 can therefore be 1 Tb or any other suitable capacity, and the second sub-capacity, Sub-cap2, of each storage drive D0, D1, D2, D3, D4 can be 1 Tb or any other suitable capacity.

It is noted that although FIG. 2a depicts the first sub-capacity, Sub-cap1, and the second sub-capacity, Sub-cap2, of each storage drive D0, D1, D2, D3, D4 as being allocated within contiguous storage space of the respective storage drives D0-D4, the first and second sub-capacities, Sub-cap 1, Sub-cap2, can alternatively be allocated within noncontiguous storage space so long as the total first sub-capacity, Sub-cap 1, of each storage drive D0, D1, D2, D3, D4 remains equal to the drive capacity, Cap2. As shown in FIG. 2a, the first sub-capacities, Sub-cap1, of the storage drives D0, D1, D2, D3, D4 in the first set 202, as well as the drive capacities, Cap2, of the storage drives D5, D6, D7, D8, D9 in the second set 204, are designated and regarded as a hot storage tier 206, which can be allocated within contiguous or noncontiguous storage space of the respective storage drives. As further shown in FIG. 2a, the second sub-capacities, Sub-cap2, of the storage drives D0, D1, D2, D3, D4 in the first set 202 are designated and regarded as a cold storage tier 208, which can also be allocated within contiguous or noncontiguous storage space of the respective storage drives. In some embodiments, the first sub-capacity, Sub-cap1, can correspond to a predetermined threshold percentage of the capacity of each storage drive D0, D1, D2, D3, D4, such as 50% or any other suitable percentage. Likewise, the second sub-capacity, Sub-cap2, can correspond to a predetermined threshold percentage of the capacity of each storage drive D0, D1, D2, D3, D4, such as 50% or any other suitable percentage.

Figure 2B:
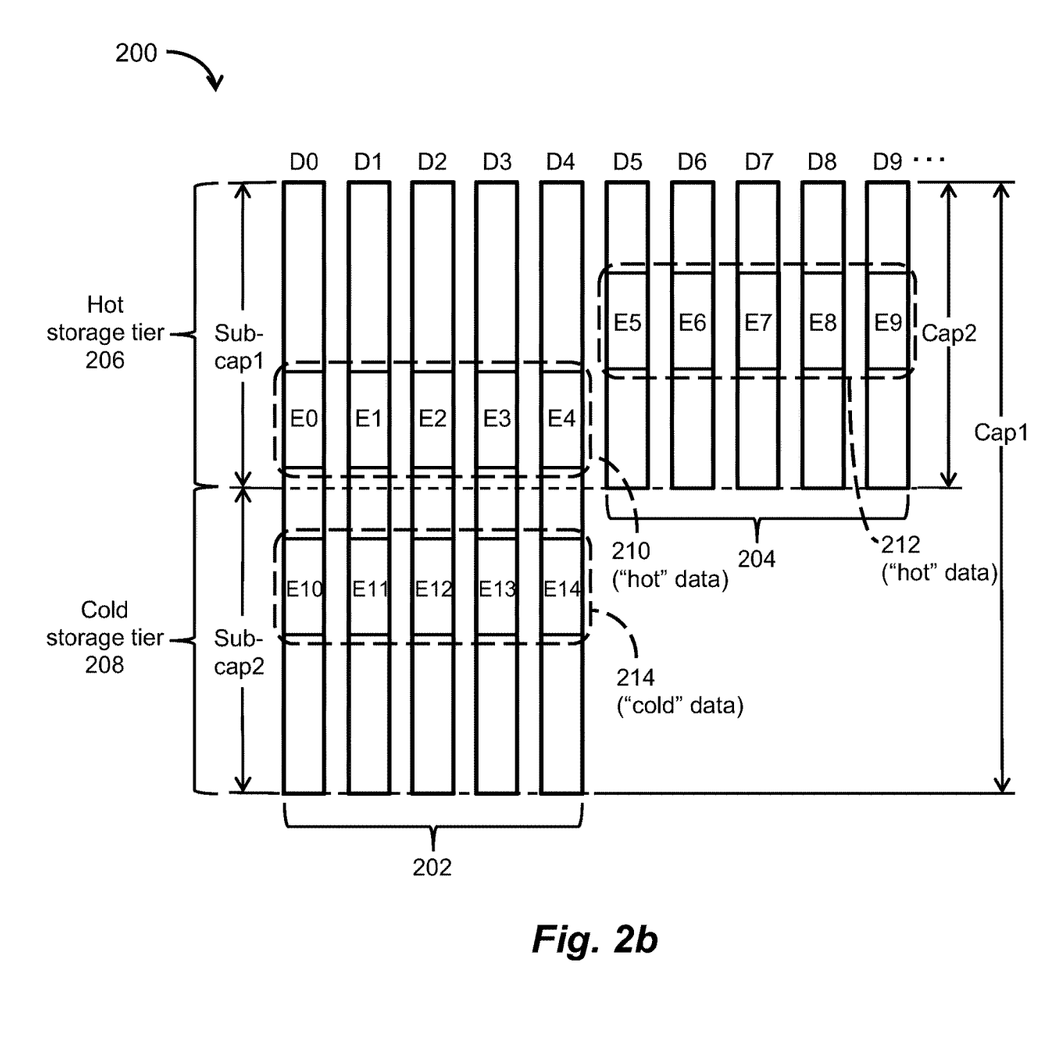
FIG. 2b is a block diagram of the storage drive array of FIG. 2a, in which first sub-capacities of the storage drives in the first set include a first redundant array of independent disk (RAID) extent containing hot data, the drive capacities of the storage drives in the second set include a second RAID extent containing hot data, and second sub-capacities of the storage drives in the first set include a third RAID extent containing cold data.

In this example, each of the storage drives D0 through D9 is divided into a plurality of drive extents, including at least a plurality of drive extents E0, E1, E2, E3, E4 (see FIG. 2b) within the first sub-capacities, Sub-cap 1, of the storage drives D0, D1, D2, D3, D4, respectively, a plurality of drive extents E5, E6, E7, E8, E9 (see FIG. 2b) within the drive capacities, Cap2, of the storage drives D5, D6, D7, D8, D9, respectively, and a plurality of drive extents E10, E11, E12, E13, E14 (see FIG. 2b) within the second sub-capacities, Sub-cap2, of the storage drives D0, D1, D2, D3, D4, respectively. It is noted that the pluralities of drive extents E0-E4, E5-E9, and E10-E14 are depicted in FIG. 2b for purposes of illustration, and that each storage drive D0 through D9 can be divided into a multitude of drive extents. The RAID manager 122 creates or provisions RAID extents by organizing such pluralities of drive extents in accordance with a given RAID configuration, such as a RAID-5 configuration (1 parity block, p; 4 data blocks, n-p) or any other suitable RAID configuration.

In response to a first write IO operation for writing first client data to the storage drive array 200, the mapping manager 120 determines whether the first client data can be regarded as hot data or cold data. If the mapping manager 120 determines that the first client data can be regarded as hot data (i.e., the data is being frequently accessed and/or modified or updated), then the first client data can be stored in either the first sub-capacities, Sub-cap1, of the storage drives D0, D1, D2, D3, D4 or the drive capacities, Cap2, of the storage drives D5, D6, D7, D8, D9, i.e., in the hot storage tier 206. In this example, the mapping manager 120 determines that the first client data can be regarded as hot data. Further, the RAID manager 122 organizes the drive extents E0, E1, E2, E3, E4 into a RAID-5 extent 210 (see FIG. 2b), and the mapping manager 120 maps or places the first client data (i.e., the "hot" data) in the RAID-5 extent 210 within the first sub-capacities, Sub-cap 1, of the storage drives D0, D1, D2, D3, D4.

In response to a second write IO operation for writing second client data to the storage drive array 200, the mapping manager 120 determines whether the second client data can be regarded as hot data or cold data. If the mapping manager 120 determines that the second client data can be regarded as hot data (i.e., the data is being frequently accessed and/or modified or updated), then the second client data can be stored in either the first sub-capacities, Sub-cap1, of the storage drives D0, D1, D2, D3, D4 or the drive capacities, Cap2, of the storage drives D5, D6, D7, D8, D9, i.e., in the hot storage tier 206. In this example, the mapping manager 120 determines that the second client data can also be regarded as hot data. Further, the RAID manager 122 organizes the drive extents E5, E6, E7, E8, E9 into a RAID-5 extent 212, and the mapping manager 120 maps or places the second client data (i.e., the "hot" data) in the RAID-5 extent 212 within the drive capacities, Cap2, of the storage drives D5, D6, D7, D8, D9.

In response to a third write IO operation for writing third client data to the storage drive array 200, the mapping manager 120 determines whether the third client data can be regarded as hot data or cold data. If the mapping manager 120 determines that the third client data can be regarded as cold data (i.e., the data is being infrequently accessed and/or rarely modified or updated), then the third client data can be stored in the second sub-capacities, Sub-cap2, of the storage drives D0, D1, D2, D3, D4, i.e., in the cold storage tier 208. In some embodiments, such cold data can be stored in the cold storage tier 208 during execution of a garbage collection routine for reclaiming drive storage space occupied by the cold data. In this example, the mapping manager 120 determines that the third client data can be regarded as cold data. Further, the RAID manager 122 organizes the drive extents E10, E11, E12, E13, E14 into a RAID-5 extent 214, and the mapping manager 120 maps or places the third client data (i.e., the "cold" data) in the RAID-5 extent 214 within the second sub-capacities, Sub-cap2, of the storage drives D0, D1, D2, D3, D4.

By provisioning RAID extents for hot data (e.g., the RAID-5 extents 210, 212) within the first sub-capacities, Sub-cap 1, of the storage drives D0, D1, D2, D3, D4 and/or the drive capacities, Cap2, of the storage drives D5, D6, D7, D8, D9 (i.e., within the hot storage tier 206), uniform IOPS densities across the first set 202 of storage drives D0, D1, D2, D3, D4 and the second set 204 of storage drives D5, D6, D7, D8, D9 can be better maintained, due to the first sub-capacity, Sub-cap 1, of each storage drive D0, D1, D2, D3, D4 being equal to the drive capacity, Cap2, of each storage drive D5, D6, D7, D8, D9. Because the first sub-capacities, Sub-cap1, of the storage drives D0-D4 are equal to the drive capacities, Cap2, of the storage drives D5-D9, IO bottleneck (or IOPS) problems, which might otherwise occur if either the first sub-capacity, Sub-cap1, or the drive capacity, Cap2, were higher than the other, can be avoided. Moreover, by provisioning RAID extents for cold data (e.g., the RAID-5 extent 214) within the second sub-capacities, Sub-cap2, of the storage drives D0, D1, D2, D3, D4 (i.e., within the cold storage tier 208), the different capacities of the respective storage drives D0 through D9 can be more effectively utilized. Because the cold data stored in the second sub-capacities, Sub-cap2, of the storage drives D0-D4 are infrequently accessed and/or rarely modified or updated, the uniform IOPS densities across the first and second sets 202, 204 of storage drives can be maintained while avoiding wasting unused capacity across at least the storage drives D0-D4 in the first set 202.

From time to time, data stored in the second sub-capacities, Sub-cap2, of the storage drives D0, D1, D2, D3, D4 may transition from being cold data to hot data. In other words, data in the cold storage tier 208 that was previously infrequently accessed may become more frequently accessed. As described herein, each of the first sub-capacity, Sub-cap1, and the second sub-capacity, Sub-cap2, can correspond to a predetermined threshold percentage of the capacity of each storage drive D0, D1, D2, D3, D4 (e.g., 50%). As such, once data stored in the second sub-capacities, Sub-cap2, of the storage drives D0-D4 transition from being "cold" to "hot," the RAID manager 122 can reallocate the first sub-capacity, Sub-cap 1, and the second sub-capacity, Sub-cap2, of each storage drive D0, D1, D2, D3, D4 to maintain the corresponding predetermined threshold percentages of 50%, without requiring any movement of the data. It is noted that such reallocations of the first and second sub-capacities, Sub-cap 1, Sub-cap2, can be performed so long as there is sufficient free space on the respective storage drives D0, D1, D2, D3, D4 to perform the reallocations.

In this example, it is assumed that the data in the RAID-5 extent 214 (see FIG. 2c) transitions from being "cold" to "hot," and that a RAID-5 extent 216 made up of drive extents E15, E16, E17, E18, E19 (see FIG. 2c) encompasses free space in the sub-capacities, Sub-cap1, of the storage drives D0, D1, D2, D3, D4. Once the data in the RAID-5 extent 214 transitions from being "cold" to "hot," the RAID manager 122 reallocates the first sub-capacity, Sub-cap1, of each storage drive D0, D1, D2, D3, D4 to include a sub-capacity designated as "Sub-cap1a," a sub-capacity designated as "Sub-cap1b," and a sub-capacity designated as "Sub-cap1c," which contains the hot data in the RAID-5 extent 214. In addition, the RAID manager 122 reallocates the second sub-capacity, Sub-cap2, of each storage drive D0, D1, D2, D3, D4 to include a sub-capacity designated as "Sub-cap2a," a sub-capacity designated as "Sub-cap2b," and a sub-capacity designated as "Sub-cap2c," which includes the free space encompassed by the RAID-5 extent 216. Having reallocated the first and second sub-capacities, Sub-cap 1, Sub-cap2, of each storage drive D0, D1, D2, D3, D4, the sum of the sub-capacities Sub-cap1a, Sub-cap1b, and Sub-cap1c is equal to the predetermined threshold percentage of 50% of the respective storage drives D0, D1, D2, D3, D4. Further, the sum of the sub-capacities Sub-cap2a, Sub-cap2b, and Sub-cap2c is equal to the predetermined threshold percentage of 50% of the respective storage drives D0, D1, D2, D3, D4.

Figure 2C:
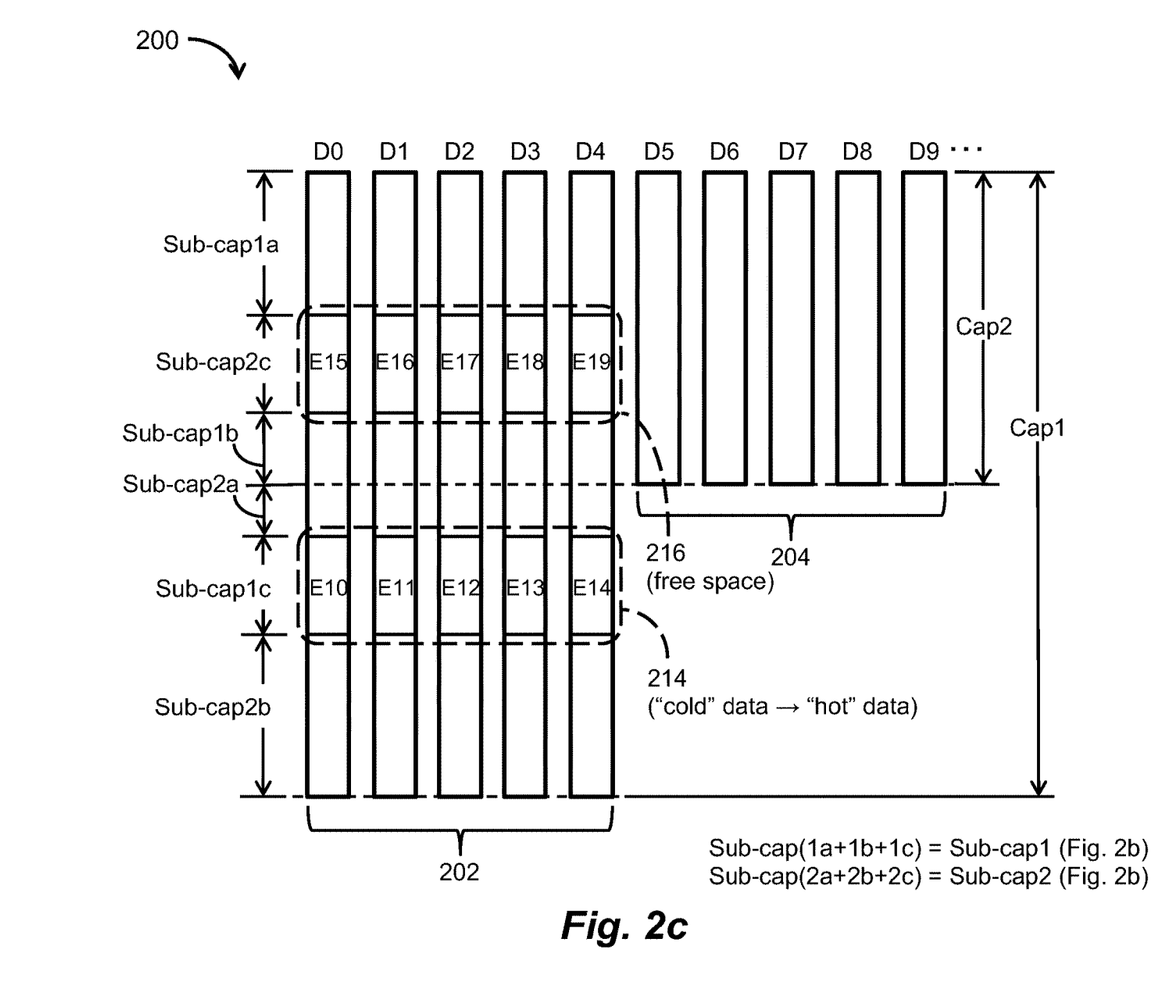
FIG. 2c is a block diagram of the storage drive array of FIG. 2b, in which the cold data included in the third RAID extent transitions to hot data.
Figure 2D:
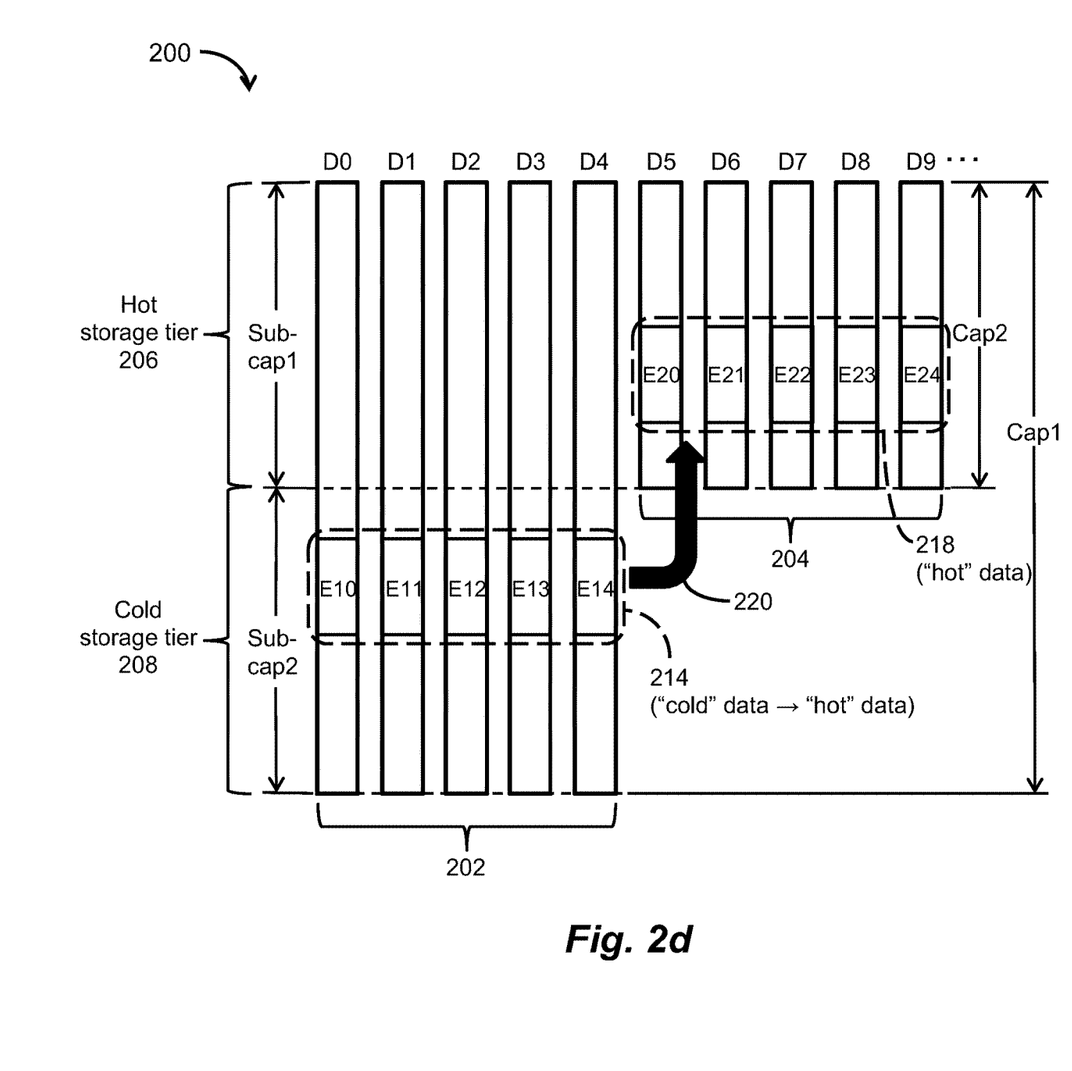
FIG. 2d is another block diagram of the storage drive array of FIG. 2b, in which the cold data included in the third RAID extent transitions to hot data.

It is noted that the reallocations of the first and second sub-capacities, Sub-cap1, Sub-cap2, of the storage drives D0, D1, D2, D3, D4, as illustrated in FIG. 2c, can be performed without requiring any movement of the data in the RAID-5 extent 214. It is further noted, however, that if the data in the RAID-5 extent 214 transitions from being "cold" to "hot" and there is not sufficient free space in the sub-capacities, Sub-cap1, of the storage drives D0-D4 to perform the reallocations, then the mapping manager 120 can map, place, or otherwise move the data in the RAID-5 extent 214 to a RAID-5 extent 218 made up of drive extents E20, E21, E22, E23, E24 within the drive capacities, Cap2, of the storage drives D5, D6, D7, D8, D9, as illustrated in FIG. 2d by a block arrow 220. In effect, the data in the RAID-5 extent 214 are moved to the RAID-5 extent 218, which encompasses free space in the drive capacities, Cap2, of the storage drives D5, D6, D7, D8, D9. In this way, data that has transitioned from being cold data to hot data can be "up-tiered" from the cold storage tier 208 to the hot storage tier 206.

Figure 3:
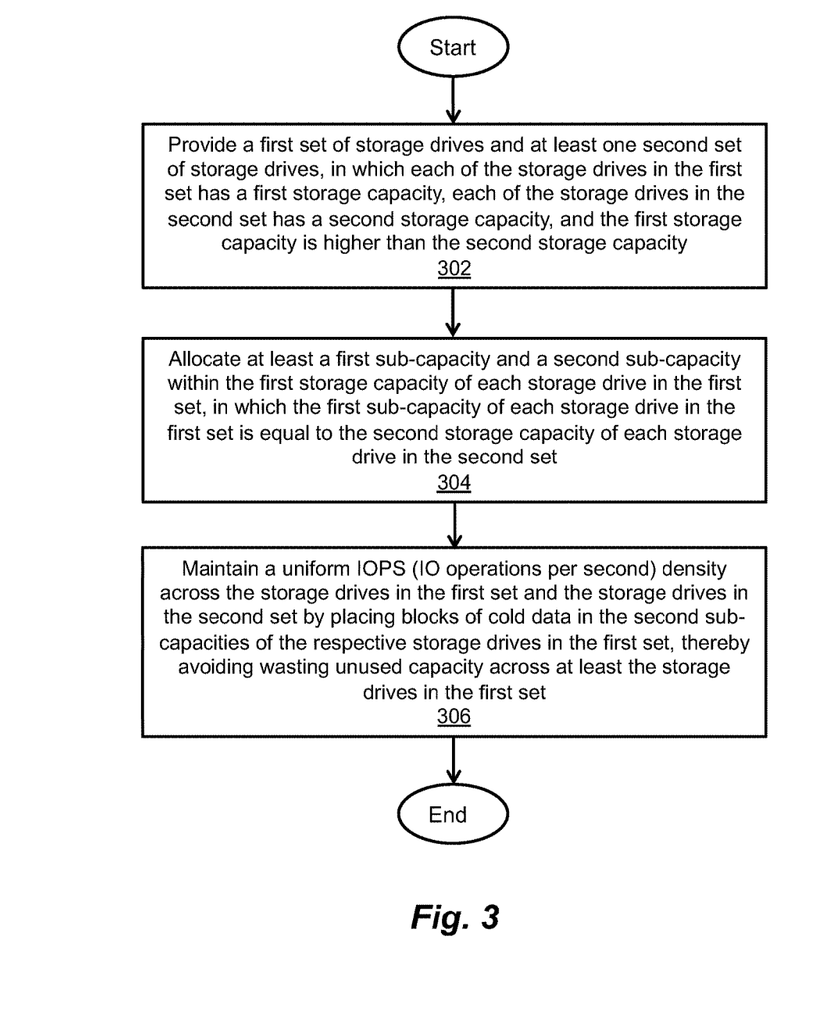
FIG. 3 is a flow diagram of an exemplary method of providing effective utilization of different drive capacities in a storage appliance.

An exemplary method of providing effective utilization of different drive capacities in a storage appliance is described below with reference to FIG. 3. As depicted in block 302, a first set of storage drives and at least one second set of storage drives are provided, in which each of the storage drives in the first set has a first storage capacity, each of the storage drives in the second set has a second storage capacity, and the first storage capacity is higher than the second storage capacity. As depicted in block 304, at least a first sub-capacity and a second sub-capacity are allocated within the first storage capacity of each storage drive in the first set, in which the first sub-capacity of each storage drive in the first set is equal to the second storage capacity of each storage drive in the second set. As depicted in block 306, a uniform IOPS (10 operations per second) density is maintained across the storage drives in the first set and the storage drives in the second set by placing blocks of cold data in the second sub-capacities of the respective storage drives in the first set, thereby avoiding wasting unused capacity across at least the storage drives in the first set.

Having described the above illustrative embodiments, other alternative embodiments or variations can be made and/or practiced. For example, it was described herein with reference to FIG. 2b that the RAID manager 122 (see FIG. 1) can create or provision RAID extents by organizing pluralities of drive extents on the set of storage drives D0-D4 and the set of storage drives D5-D9 in accordance with a given RAID configuration, such as a RAID-5 configuration or any other suitable RAID configuration. In this way, the same RAID configuration, e.g., RAID-5 (4+1), can be employed in both the hot storage tier 206 and the cold storage tier 208 of the storage drive array 200. In some embodiments, different RAID configurations can be employed in a cold storage tier and a hot storage tier of a storage appliance. For example, a RAID-5 (4+1) configuration (or any other suitable RAID configuration) may be employed in the cold storage tier 208 (see FIG. 2b) implemented by the storage drives D0 through D4, while a different RAID configuration (e.g., RAID-9 (8+1) or any other suitable RAID configuration) that spans up to all of the storage drives D0, D1, . . . , D9 . . . may be employed in the hot storage tier 206 (see FIG. 2b) implemented by the storage drives D0 through D9. In this way, a desired high level of performance can be provided in the more frequently accessed hot storage tier 206, while a lower level of performance can be provided in the less frequently accessed cold storage tier 208, based on the RAID configurations employed in the respective storage tiers 206, 208. Further, based on the RAID configuration employed in the hot storage tier 206, the performance level of the hot storage tier 206 can be scaled to satisfy the needs of the data storage customer.

It was further described herein that data that has transitioned from being cold data to hot data can be "up-tiered" from the cold storage tier 208 to the hot storage tier 206 of the storage drive array 200 (see, e.g., FIG. 2d). In some embodiments, data that has transitioned from being hot data to cold data can be "down-tiered" from the hot storage tier 206 to the cold storage tier 208 of the storage drive array 200, so long as there is sufficient free space in the drive capacity of the cold storage tier 208. In some embodiments, the IOPS levels of some or all of the storage drives D0, D1, . . . , Dm, . . . of the storage drive array 200 can be monitored continuously or at least at intervals, and once the IOPS levels of the storage drives have saturated, only cold data may be stored on the respective storage drives to avoid 10 bottleneck problems.

It was further described herein that the mapping manager 120 (see FIG. 1) can be configured to map storage extents of volumes to corresponding RAID addresses, which, in turn, can be mapped to corresponding drive locations (e.g., drive extents) on the storage drive array 106. In some embodiments, the disclosed techniques can be employed in traditional "unmapped" RAID systems or mapped RAID systems to achieve more effective utilization of storage drives with different capacities in the respective RAID systems.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe nonlimiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

A computer program product can be configured to deliver all or a portion of specialized code and data for implementing the disclosed techniques. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by one or more processors or processing circuitry, the various techniques and/or methods disclosed herein.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing effective utilization of different drive capacities in a storage appliance, comprising:
   providing a storage appliance that includes a storage drive array, the storage drive array including a first set of storage drives and a second set of storage drives, each of the storage drives in the first set having a first total storage capacity, each of the storage drives in the second set having a second total storage capacity, the first total storage capacity of the storage drives in the first set being higher than the second total storage capacity of the storage drives in the second set, the first total storage capacity having a first storage sub-capacity and a second storage sub-capacity, the first storage sub-capacity being equal to the second total storage capacity, the first storage sub-capacity corresponding to a first predetermined threshold percentage of the first total storage capacity, and the second storage sub-capacity corresponding to a second predetermined threshold percentage of the first total storage capacity;
   allocating the first storage sub-capacity of each storage drive in the first set for storing hot data;
   allocating the second total storage capacity of each storage drive in the second set for storing hot data, the allocated first storage sub-capacity of the storage drives in the first set and the allocated second total storage capacity of the storage drives in the second set collectively corresponding to a hot storage tier;
   allocating the second storage sub-capacity of each storage drive in the first set for storing cold data, the allocated second storage sub-capacity of the storage drives in the first set corresponding to a cold storage tier;
   determining free space in the allocated first storage sub-capacity of each storage drive in the first set;
   determining blocks of cold data stored in the allocated second storage sub-capacity transitioning to blocks of hot data; and
   in response to the blocks of cold data stored in the allocated second storage sub-capacity transitioning to the blocks of hot data:
      reallocating the first storage sub-capacity of each storage drive in the first set, wherein reallocating the first storage sub-capacity comprises placing the blocks of hot data in the reallocated first storage sub-capacity in accordance with a RAID configuration that spans all the storage drives in the first set and all the storage drives in the second set, the reallocated first storage sub-capacity maintaining the first predetermined threshold percentage of the first total storage capacity; and
      reallocating the second storage sub-capacity of each storage drive in the first set, wherein reallocating the second storage sub-capacity comprises including the free space in a portion of the reallocated second storage sub-capacity, the reallocated second storage sub-capacity maintaining the second predetermined threshold percentage of the first total storage capacity.

2. The method of claim 1 further comprising:
placing the blocks of hot data in the reallocated first storage sub-capacity of each storage drive in the first set in accordance with a RAID configuration.

3. The method of claim 2 further comprising:
scaling a performance level of the hot storage tier by placing the blocks of hot data in accordance with the RAID configuration that spans all the storage drives in the first set and all the storage drives in the second set.

4. The method of claim 1 wherein the reallocating of one or more of the first storage sub-capacity and the second storage sub-capacity is performed within contiguous storage space of the first storage capacity of each storage drive in the first set.

5. The method of claim 1 wherein the reallocating of one or more of the first storage sub-capacity and the second storage sub-capacity is performed within noncontiguous storage space of the first storage capacity of each storage drive in the first set.

6. A system for providing effective utilization of different drive capacities in a storage appliance, comprising:
   a storage drive array including a first set of storage drives and a second set of storage drives, each of the storage drives in the first set having a first total storage capacity, each of the storage drives in the second set having a second total storage capacity, the first total storage capacity of the storage drives in the first set being higher than the second total storage capacity of the storage drives in the second set, the first total storage capacity having a first storage sub-capacity and a second storage sub-capacity, the first storage sub-capacity being equal to the second total storage capacity, the first storage sub-capacity corresponding to a first predetermined threshold percentage of the first total storage capacity, and the second storage sub-capacity corresponding to a second predetermined threshold percentage of the first total storage capacity;
   a memory; and
   processing circuitry configured to execute program instructions out of the memory to:
      allocate the first storage sub-capacity of each storage drive in the first set for storing hot data;

allocate the second total storage capacity of each storage drive in the second set for storing hot data, the allocated first storage sub-capacity of the storage drives in the first set and the allocated second total storage capacity of the storage drives in the second set collectively corresponding to a hot storage tier;

allocate the second storage sub-capacity of each storage drive in the first set for storing cold data, the allocated second storage sub-capacity of the storage drives in the first set corresponding to a cold storage tier;

determine free space in the allocated first storage sub-capacity of each storage drive in the first set;

determine blocks of cold data stored in the allocated second storage sub-capacity transitioning to blocks of hot data; and in response to the blocks of cold data stored in the allocated second storage sub-capacity transitioning to the blocks of hot data:

reallocate the first storage sub-capacity of each storage drive in the first set, wherein reallocating the first storage sub-capacity comprises placing the blocks of hot data in the reallocated first storage sub-capacity in accordance with a RAID configuration that spans all the storage drives in the first set and all the storage drives in the second set, the reallocated first storage sub-capacity maintaining the first predetermined threshold percentage of the first total storage capacity; and reallocate the second storage sub-capacity of each storage drive in the first set, wherein reallocating the second storage sub-capacity comprises including the free space in a portion of the reallocated second storage sub-capacity, the reallocated second storage sub-capacity maintaining the second predetermined threshold percentage of the first total storage capacity.

7. The system of claim 6 wherein the processing circuitry is further configured to execute the program instructions out of the memory to reallocate one or more of the first storage sub-capacity and the second storage sub-capacity within contiguous storage space of the first total storage capacity of each storage drive in the first set.

8. The system of claim 6 wherein the processing circuitry is further configured to execute the program instructions out of the memory to reallocate one or more of the first storage sub-capacity and the second storage sub-capacity within noncontiguous storage space of the first total storage capacity of each storage drive in the first set.

9. The system of claim 6 wherein each of the storage drives in the first set and each of the storage drives in the second set correspond to the same type of storage drive.

10. The system of claim 6 wherein the blocks of cold data stored in the allocated second storage sub-capacity of each storage drive in the first set conform to a given RAID configuration.

11. A computer program product including a set of non-transitory, computer-readable media having instructions that, when executed by processing circuitry, cause the processing circuitry to perform a method of providing effective utilization of different drive capacities in a storage appliance, the method comprising:

providing a storage appliance that includes a storage drive array, the storage drive array including a first set of storage drives and a second set of storage drives, each of the storage drives in the first set having a first total storage capacity, each of the storage drives in the second set having a second total storage capacity, the first total storage capacity of the storage drives in the first set being higher than the second total storage capacity of the storage drives in the second set, the first total storage capacity having a first storage sub-capacity and a second storage sub-capacity, the first storage sub-capacity being equal to the second total storage capacity, the first storage sub-capacity corresponding to a first predetermined threshold percentage of the first total storage capacity, and the second storage sub-capacity corresponding to a second predetermined threshold percentage of the first total storage capacity;

allocating the first storage sub-capacity of each storage drive in the first set for storing hot data;

allocating the second total storage capacity of each storage drive in the second set for storing hot data, the allocated first storage sub-capacity of the storage drives in the first set and the allocated second total storage capacity of the storage drives in the second set collectively corresponding to a hot storage tier;

allocating the second storage sub-capacity of each storage drive in the first set for storing cold data, the allocated second storage sub-capacity of the storage drives in the first set corresponding to a cold storage tier;

determining free space in the allocated first storage sub-capacity of each storage drive in the first set;

determining blocks of cold data stored in the allocated second storage sub-capacity transitioning to blocks of hot data; and in response to the blocks of cold data stored in the allocated second storage sub-capacity transitioning to the blocks of hot data:

reallocating the first storage sub-capacity of each storage drive in the first set, wherein reallocating the first storage sub-capacity comprises placing the blocks of hot data in the reallocated first storage sub-capacity in accordance with a RAID configuration that spans all the storage drives in the first set and all the storage drives in the second set, the reallocated first storage sub-capacity maintaining the first predetermined threshold percentage of the first total storage capacity; and reallocating the second storage sub-capacity of each storage drive in the first set, wherein reallocating the second storage sub-capacity comprises including the free space in a portion of the reallocated second storage sub-capacity, the reallocated second storage sub-capacity maintaining the second predetermined threshold percentage of the first total storage capacity.

* * * * *